(12) United States Patent
Yamazaki (10) Patent No.: US 7,009,793 B2
(45) Date of Patent: Mar. 7, 2006

(54) MAGNETIC DISK APPARATUS, READ GATE OPTIMIZATION METHOD AND PROGRAM

(75) Inventor: Yuichiro Yamazaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 10 days.

(21) Appl. No.: 10/776,124

(22) Filed: Feb. 11, 2004

(65) Prior Publication Data

US 2004/0228021 A1 Nov. 18, 2004

(30) Foreign Application Priority Data

May 15, 2003 (JP) ............................. 2003-136868

(51) Int. Cl.
*G11B 5/09* (2006.01)
(52) U.S. Cl. ............................. 360/51; 360/53; 360/31; 714/47; 714/769
(58) Field of Classification Search ................. 360/51, 360/53, 46, 48, 31, 61, 62, 63, 97.02, 12; 714/47, 704, 708, 769, 770, 774, 795–796
See application file for complete search history.

(56) References Cited

U.S. PATENT DOCUMENTS 6,229,660 B1 * 5/2001 Chung ........................ 360/51

* cited by examiner

*Primary Examiner*—David Hudspeth
*Assistant Examiner*—Natalia Figueroa
(74) *Attorney, Agent, or Firm*—Greer, Burns & Crain, Ltd.

(57) ABSTRACT

A hard disk controller generates a read gate signal RG which has a predefined read start time and read end time set based on a sector pulse as a reference. A read data demodulation unit reproduces read data from a readout signal of medium by executing a read based on the read gate signal RG. A read gate optimization unit detects errors of read data demodulated by the data demodulation unit while varying the read start time and the read end time of the read gate signal RG, determines the read start time and the read end time at which the detected errors will be minimized and sets these in the read gate generation unit.

18 Claims, 10 Drawing Sheets

| READ START TIME | TS |
|---|---|
| READ END TIME | TE |
| VARIABLE AMOUNT (BYTE TIME) | 0,+1,+2,+3,+4,−1,−2,−3,−4 |

| HEAD NUMBER | ZONE NUMBER | READ START TIME | READ END TIME |
|---|---|---|---|
| H1 | Z1 | TS+1 | TE |
|  | Z2 | TS | TE−1 |
|  | Z3 | TS−1 | TE+1 |
|  | Z4 | TS | TE |
|  | Z5 | TS+2 | TE |
|  | ⋮ | ⋮ | ⋮ |
|  | Zn | TS | TE+1 |
| H2 | Z1 | TS | TE |
|  | Z2 | TS+1 | TE |
|  | Z3 | TS | TE+1 |
|  | Z4 | TS | TE |
|  | Z5 | TS−1 | TE−2 |
|  | ⋮ | ⋮ | ⋮ |
|  | Zn | TS | TE |
| Hn | Z1 | TS | TE+1 |
|  | Z2 | TS | TE |
|  | Z3 | TS−2 | TE |
|  | Z4 | TS−1 | TE−1 |
|  | Z5 | TS | TE |
|  | ⋮ | ⋮ | ⋮ |
|  | Zn | TS | TE |

MAGNETIC DISK APPARATUS, READ GATE OPTIMIZATION METHOD AND PROGRAM

BACKGROUND OF THE INVENTION

1. Field of the Invention

The present invention relate generally to a magnetic disk apparatus, read gate optimization method and program for demodulating read data from medium readout signals by setting a read gate, and more particularly, to a magnetic disk apparatus, read gate optimization method and program for optimizing start and end timings of the read gate by executing test read.

2. Description of the Related Art

Traditionally, in a magnetic disk apparatus, read execution time is determined by generating read gate signals based on sector pulses as a reference obtained from readout signals of servo information recorded on a medium, and typically, the read execution time is constant at any location on the medium. This is because the format of the magnetic disk apparatus itself is always constant in any data area on the medium. As a specific example, in the case of a format in which a sync byte portion (SB portion) is four (4) bytes, a data portion (Data) is 512 bytes, and ECC portion is 30 bytes, $$\text{Read Time} = \text{PLO} + \text{SB} + \text{Data} + \text{ECC} + a = (\text{PLO} + 546 + a) \text{ bytes} \quad (1)$$

It is noted that PLO is a necessary pull-in time for AGC and PLL of a read channel, and a is a time depending on a pipeline (usually, negative). The time to start reading is controlled on the upper side, for example within a hard disk controller (HDC). In the hard disk controller, a sector pulse, which is a reference clock for controlling the write and read timings, is generated by a window (servo gate) indicating the servo information, and a read start time, at which a read gate signal rises, is determined based on the sector pulse as a reference. The read start time is a value determined in order to read data written on the medium at an optimum position, and determining factors can include for example the above-described necessary pull-in time for AGC and PLL of a read channel, a delay time of a head IC at the time of writing, an encoder delay time of the read channel and a gap distance between a write head and a read head. On the other hand, a read end time, at which a read gate signal falls, will be after the read time of Equation (1) from the read start time. It is typical as techniques used in the conventional magnetic disk apparatuses to us the sector pulse as a reference for the read start time, start reading from the predetermined timing and terminate the reading after the elapse of a given time therefrom. Also, recently, a zone bit recording method is often used in which recording is performed by dividing radial direction into several zones and changing a transfer rate. Again, in this case, the inside of the magnetic disk apparatus is configured depending on a predetermined sector format at any location on the medium, and therefore, the read time is constant as long as the sector format is constant (See, e.g., Japanese Patent Application Laid-open Pub. No. Heill-31358).

However, in these conventional magnetic disk apparatuses, there are problems as follows.

(1) Problem likely to occur when the read start time is a specified value.

If a gap between a write head and a read head equipped on a head is larger, the data to be written on the medium will be written temporally later. Therefore, if reading started from the specified read start time, it will be impossible to read out from PLO position which is actually supposed to be read, and reading will be started earlier from the preceding position where PLO is not written. In this case, since foundation data before writing has been typically erased in terms of DC, DC erased portion is read when the reading Is started, therefore automatic gain control (AGC) can malfunction in demodulation IC. Such gap distance between a write head and a read head depends on the property of the heads which read and write data and varies according to manufacturers of the heads and differences between wafers.

(2) Problem likely to occur when the read end time is a specified value.

If the read end time is a specified value, as a possible phenomenon, when data to be written on the medium has been written temporally earlier, a data in PAD portion after ECC can not be read out. In this case, data which is different from the phase of written data have been written in the PAD portion, therefore miscorrection by a decoder will be caused in a read channel. In this way, miscorrection of ECC portion can be raised by the data. As a factor making data to be written on the medium earlier, there is a case that properties of heads and preamplifiers are changed by environmental temperature and others.

(3) Problem likely to occur according to improvement of format efficiency (insufficient PDA). As another factor, there is a case that the data to be read has not been written till the end, because of insufficiency of PDA portion. In recent apparatus, pipeline processing is operated to improve performance, wherein the read end time is terminated at the point of time when the necessary data has been read. The pipeline processing is to execute process for reducing wasteful time in last half of the reading as much as possible, and as an advantage, this leads to an increase of efficiency and an improvement of performance. But, in other words, Insufficiency of margin for ensuring the reading of the last half data is caused by this. Of course, if the last half of data is written in PAD portion with sufficient length, this will not be happen, but recently, the PAD portion tends to be reduced for improving the format efficiency as much as possible, so the PAD portion is becoming to be not always present sufficiently. Because of such insufficiency of the margin for the last half of data, last half of PAD portion in which data is not written is read out, and a data error, which is miscorrection of ECC in this case, is caused by this.

SUMMARY OF THE INVENTION

According to the invention, there is a magnetic disk apparatus, read gate optimization method and program for enabling readout with reduced errors by optimizing a read executing time.

According to a first aspect of the present invention there is provided a magnetic disk apparatus including a read gate generation unit which generates a read gate signal having a predefined read start time and read end time that are set using a sector pulse as a reference; and a read data demodulation unit which reproduces read data from a medium readout signal by executing a read based on the read gate signal, the magnetic disk apparatus comprising:

a read gate optimization unit which detects errors of read data demodulated by the read data demodulation unit while varying the read start time and the read end time of the read gate signal, the read gate optimization unit determining the read start time and the read end time at which the detected errors are minimized and setting the determined read start and end times in the read gate generation unit. In this way, by performing optimization of the start time of the read gate, it is possible to start reading correctly for the data written on the medium, to enable readout with reduced errors and to ensure that the data is read till the end. Also, by optimizing the read and time, even if the reading process is terminated earlier by the pipeline processing than the case without the pipeline processing, it is possible to read the data on medium to the correct position, and for example, the trash data which is not written after PAD will not read anymore, and as a result, ECC miscorrection will be prevented. The read gate optimization unit may include a timing adjustment unit 70 which varies the read start time and the read end time of the read gate signal for output to the data demodulation unit 76, for each of plural times of executions of test read; an error detection unit which detects errors of the read data demodulated by the data demodulation unit, for each execution of test read, based on the read gate signal output from the timing adjustment unit; and an optimum time determination unit which determines as optimum times the read start time and the read end time of the read gate signal at which the errors are minimized of a plurality of errors detected by the error detection unit, the optimum time determination unit setting the determined optimum times in the read gate generation unit. The timing adjustment unit varies the read start time and the read end time of the read gate signal individually, and the optimum time determination unit individually determines the read start time and the read end time at which the errors detected by the error detection unit are minimized, for setting in the read gate generation unit. The timing adjustment unit varies the read start time and the read end time backward and forward around a default value in a predefined time unit. Specifically, the timing adjustment unit varies the read start time and the read end time backward and forward around a default value in a read data one byte time unit. The error detection unit detects as the read data errors Viterbi metric margins (VMM) of a Viterbi determination unit disposed in the data demodulation unit, and the optimum time determination unit determines the read start time and the read end time at which the detected Viterbi metric margins are maximized, for setting in the read gate generation unit. For this Viterbi metric margin (VMM), the number of failing branches of path memory in the Viterbi determination unit is counted, and it is possible to determine details of errors with less read data comparing to the error rate. The error detection unit detects an error rate of the read data demodulated by the data demodulation unit, and the optimum time determination unit determines the read start time and the read and time at which the detected error rate is minimized, for setting in the read gate generation unit. The magnetic disk apparatus of the invention operates the read gate optimization unit and optimizes a read execution time at the power-on start. Also, the read gate optimization unit may be operated according to a predefined time schedule. Further, it is possible to operate the read gate optimization unit 66 when a change of environmental conditions, such as a temperature inside the apparatus, are detected. If a plurality of readout heads is provided, the magnetic disk apparatus of the invention operates the read gate optimization unit 66 for each head. Also, if the medium is divided into zones, the read gate optimization unit 66 is operated for each zone.

According to a second aspect of the present invention there is provided a read gate optimization method for a magnetic disk apparatus including a read gate generation unit which generates a read gate signal having a predefined read start time and read end time that are set using a sector pulse as a reference, and a data demodulation unit which reproduces read data from a medium readout signal by executing a read based on the read gate signal, the method comprising:

a timing adjustment step varying the read start time and the read end time of the read gate signal for output to the data demodulation unit, for each of plural times of executions of test read;

an error detection step detecting errors of the read data demodulated in the data demodulation unit, for each execution of test read, based on the read gate signal output in the timing adjustment step; and an optimum time determination step determining as optimum times the read start time and the read end time of the read gate signal at which the errors are minimized of a plurality of errors detected in the error detection step, and setting the determined optimum times in the read gate generation unit.

According to a third aspect of the present invention there is provided a program executed by a computer incorporated in a magnetic disk apparatus including a read gate generation unit which generates a read gate signal having a predefined read start time and read end time that are set using a sector pulse as a reference, and a data demodulation unit which reproduces read data from a medium readout signal by executing a read based on the read gate signal, the program being operable to cause the computer to execute:

a timing adjustment step varying the read start time and the read end time of the read gate signal for output to the data demodulation unit, for each of plural times of executions of test read;

an error detection step detecting errors of the read data demodulated in the data demodulation unit, for each execution of test read, based on the read gate signal output in the timing adjustment step; and an optimum time determination step determining as optimum times the read start time and the read end time of the read gate signal at which the errors are minimized of a plurality of errors detected in the error detection step, and setting the determined optimum times in the read gate generation unit. It is to be noted that the details of the read gate optimization method and the program according to the present invention will become basically the same as those of the apparatus.

The above and other objects, aspects, features and advantages of the present invention will become more apparent from the following detailed description when taken in conjunction with the accompanying drawings, in which:

DESCRIPTION OF THE PREFERRED EMBODIMENTS

Figure 1:
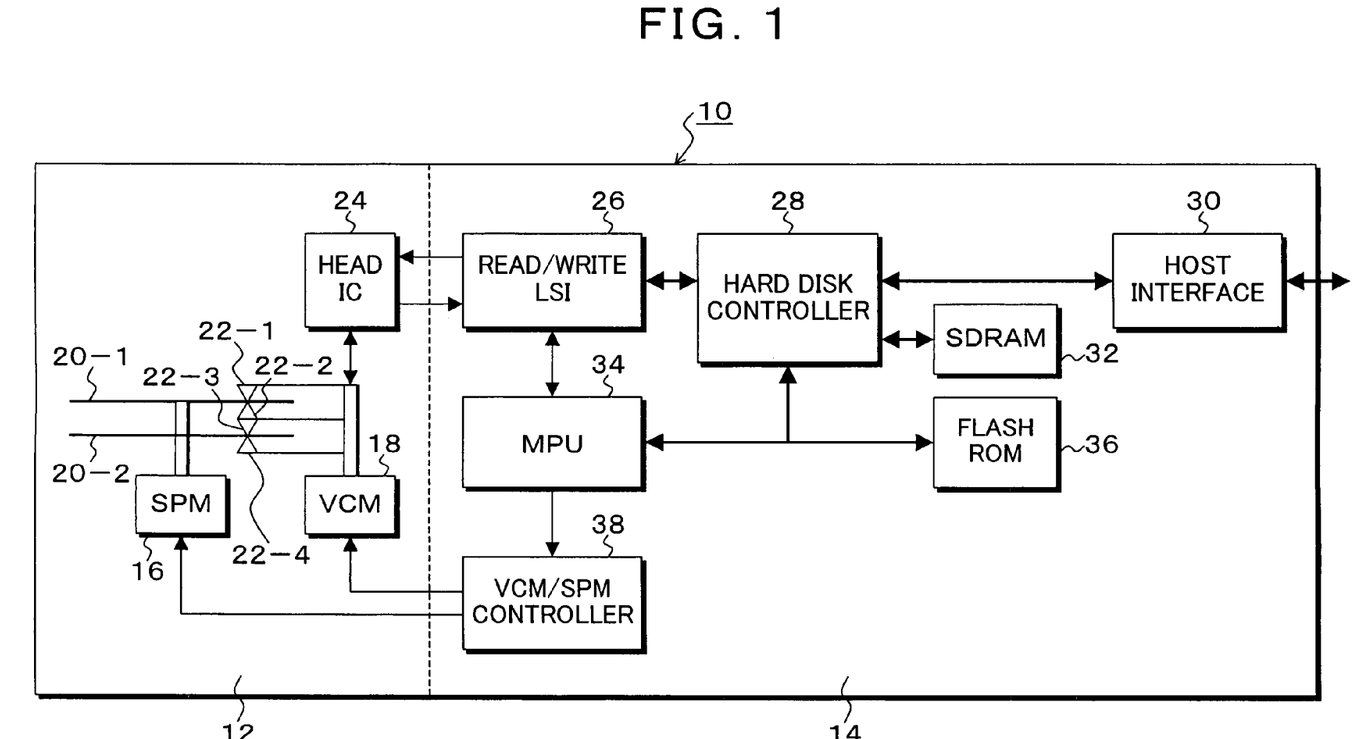
FIG. 1 is a block diagram of a magnetic disk apparatus to which the invention is applied.

FIG. 1 is a block diagram of a hard disk drive (HDD) 10 which is a magnetic disk apparatus to which the invention is applied. In FIG. 1, a hard disk drive 10 consists of a disk enclosure 12 and a control board 14. The disk enclosure 12 is provided with a spindle motor (SPM) 16 and a voice coil motor (VCM) 18. An axis of rotation of the spindle motor 16 is connected with magnetic disk medium 20-1 and 20-1 and rotates at a constant rate. The voice coil motor 18 is equipped with a head actuator, and heads 22-1 to 22-4 are supported by ends of its arms and read/write information from/to disk surfaces of the magnetic disk medium 20-1 and 20-1. The heads 22-1 to 22-4 are equipped with a write head and a read head as an integral part with a predefined gap in between. A head IC 24 is connected with each write head and read head of the heads 22-1 to 22-4 by signal lines, selects any one head based on a head selection signal from the control board 14 side and executes write or read. The control board 14 is provided with a read/write LSI 26, a hard disk controller (HDC) 28, a host interface 30, SDRAM 32, MPU 34, a flash ROM 36 and a VCM/SPM controller 38. The write and read operations in the hard disk drive 10 which has a structure like this are as follows. When a write command and write data is received from an upper apparatus, for example a personal computer, connected via the host interface 30, the write data is buffered in SDRAM32 which acts as a transfer buffer, then after the write data is formatted and encoded for ECC by the hard disk controller 28, and a demodulation process is executed by a write data demodulation unit in the read/write LSI 26 which acts as a read channel, the data is given to the head IC 24, and writing to the disk medium is executed by the write head of the head which is currently selected. At this point in time, the VCM/SPM controller 38 drives the voice coil motor 18 at the direction of MPU 34 based on the write command, and seeks the head to the medium location specified by the write command and controls it to keep on track, therefore, the write data is written in the medium location specified by the write command. When the host interface 30 receives a read command from the upper apparatus, by selecting the head IC 24 by MPU 34 and on-track positioning with a head seek of the voice coil motor 18 by VCM/SPM controller 38, the data specified by the read command is read out. For the readout signal from the magnetic disk, after pre-amplified by the head IC 24, demodulation of read data is performed in a built-in read data demodulation unit of the read/write LSI 26, error detection and correction is performed in a decoding process of ECC by the hard disk controller 28, and then, the read data is transferred to the upper apparatus from the host interface 30 via the buffer of SDRAM32 acting as a transfer buffer.

Figure 2:
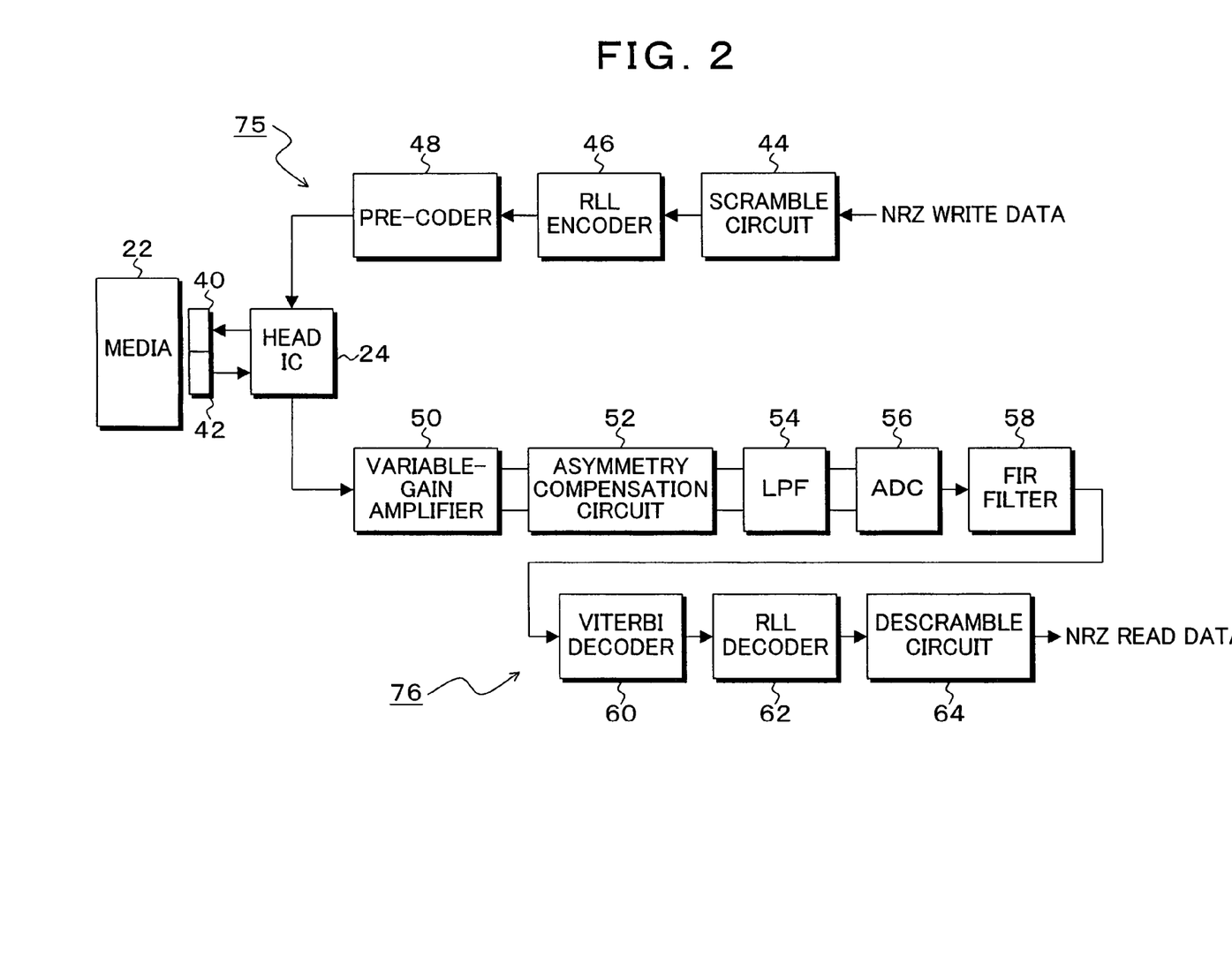
FIG. 2 is a block diagram of an internal configuration of a read/write LSI of FIG. 1.

FIG. 2 is a block diagram of an internal structure of the read/write LSI of FIG. 1. In FIG. 2, a write data modulation unit 75 consists of a scramble circuit 44, a RLL encoder 46 and a pre-coder 48. Also, a read data demodulation unit 76 consists of a variable-gain amplifier (VGA) 50, an asymmetry compensation circuit 52, a low pass filter (LPF) 54, an AD converter 56, an FIR filter 58, a Viterbi decoder 60, an RLL decoder 62 and a descramble circuit 64. NRZ write data from the hard disk controller 28 is randomized by the scramble circuit 44 and then converted into, for example, 32/34 RLL code to become data in which the number of consecutive "0" is minimized 32 and maximum 34. The pre-coder 48 moves the write data slightly in advance in order to compensate non-linear transition shift (NLTS), which, in consequence of magnetization reversal preceding one (1) bit, shifts next magnetization reversal forward. The write data in pre-coder 48 is converted from NRZ code to NRZI code (Non-Return-to Zero Interleaved code) and then recorded on the magnetic disk medium by sending a recording current corresponding to the data into the write head 40 with the write amplifier in the head IC 24. After the data recorded on the magnetic disk medium is read out by the read head 42 and amplified by the built-in preamplifier of the head IC 24, a frequency of readout waveform is fixed by the variable-gain amplifier 50; the vertical asymmetry of the waveform of the readout signal is compensated by the asymmetry compensation circuit 74; and then unnecessary noises are removed by the low pass filter 72. The AD converter 56 samples and holds the readout signal with the clock from a VFO circuit (not shown) and converts into the digital read data. The FIR filter 58 performs waveform equalization of the read data according to the partial response. The Viterbi decoder 60 consists of a determination circuit which determines a correct path by a path memory which stores candidate paths and by data inverting positive and negative alternatively and outputs the read data detected by the maximum-likelihood detection. The RLL decoder 62 converts 32/34 RLL code into the original NRZ data. The descramble circuit 64 generates the NRZ read data which is subjected to descrambling as the reverse conversion corresponding to the modulation and outputs it to the hard disk controller 28.

Figure 3:
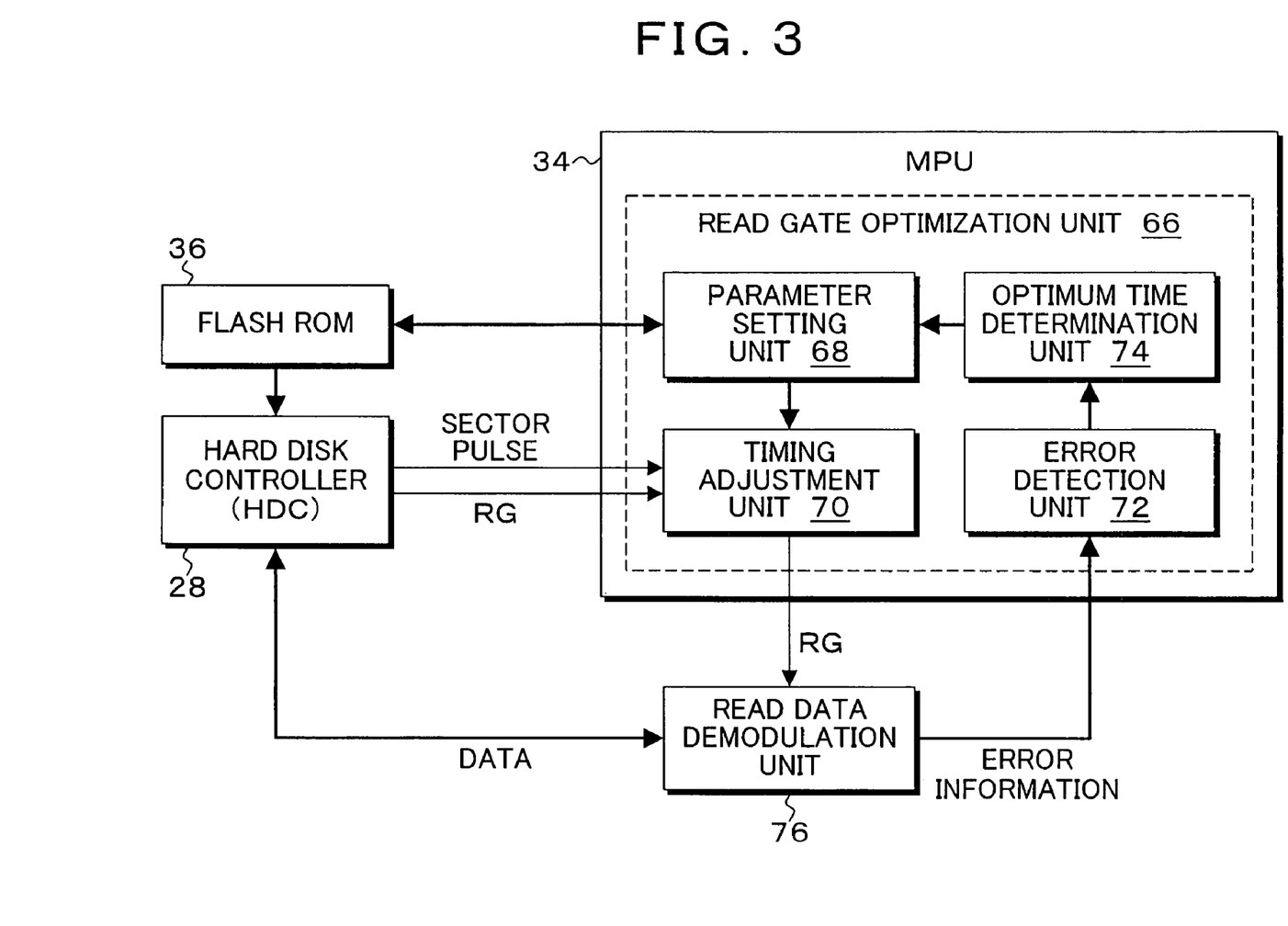
FIG. 3 is a block diagram of a functional configuration of a read gate optimization process according to the invention.
Figure 4:
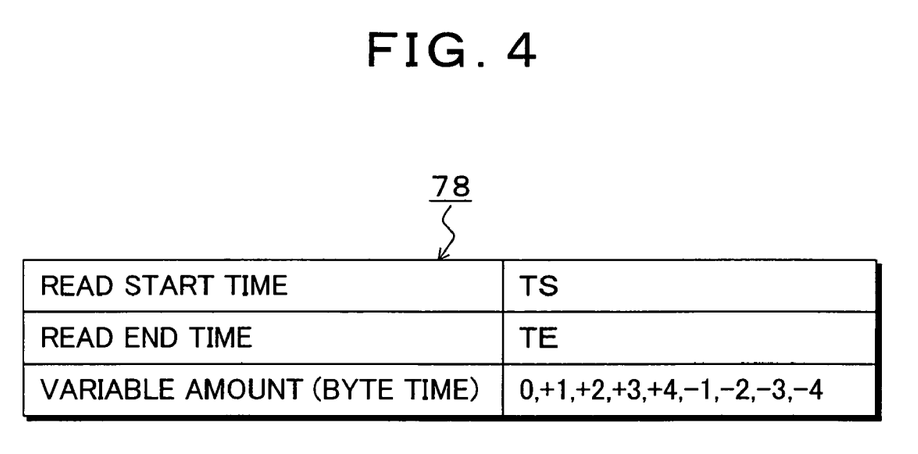
FIG. 4 is an explanatory diagram of a parameter table held in the parameter setting unit of FIG. 3.

FIG. 3 is a block diagram of a functional structure of a read gate optimization process according to the invention. In FIG. 3, the read gate optimization process according to the invention is achieved as functions of a read gate optimization unit 66 with program control of MPU 34. The read gate optimization unit 66 detects errors of the read data which is demodulated by a read data demodulation unit 76 as it changes a read start time and a read end time of a read gate signal, determines the read start time and the read end time at which the detected errors are minimum and sets these to a flash ROM 36 of the hard disk controller 28 which generates the read gate. The read gate optimization unit 66 disposed in MPU 34 has functions of a parameter setting unit 38, a timing adjustment unit 70, an optimum time determination unit 74 and an error detection unit 72. The parameter setting unit 38 stores a parameter table 78 shown in FIG. 4. The parameter table 78 stores the default read start time TS and read end time TE which are set in advance for the read gate signal, and also stores byte times which is indicated by "0, +1, +2, +3, +4, −1, −2, −3, −4" in this embodiments, as variable amounts for changing the read start time and the read end time of the read gate signal by the timing adjustment unit 70. Based on the read start time TS and the read end time TE set in the parameter setting unit 68, the timing adjustment unit 70 changes the read start time and the read end time of the read gate signal into different times for each execution of test read which is executed multiple times in order to optimize the read gate, and outputs it to the read data demodulation unit 76. At this point, in the adjustment by the timing adjustment unit 70, a process to vary the read start time of the read gate time and a process to vary the read end time of the read gate time are divided and individually executed. It is noted that parameters of the parameter table 78 are reserved as values of a program domain in an actual program. The error detection unit 72 detects errors of the read data demodulated by the read data demodulation unit 76 for each execution of the test read according to the read gate signal from the timing adjustment unit 70. As the error detection method in the invention, either of following two (2) methods is performed.

(1) Viterbi metric margin (VMM) in the Viterbi decoder 60.

(2) Error rate.

As the Viterbi metric margins detected inside the Viterbi decoder 60, the number of paths failing to branch out in a built-in path memory is counted, and since this is a value relatively easy to obtain with the read data, it is possible to detect errors of the read data faster. On the contrary, as the error rate, the number of error bits is counted by comparing the write data with the read data for each bit, and it is possible to detect the error rate accurately, but since certain amount of the read data is needed, it takes longer time than the error detection according to the Viterbi metric margins. The optimum time determination unit 74 determines the read star time and the read end time of the read gate signal which timing is adjusted such that errors will be minimized among errors for the results of the plural times of executions of test reads detected by the error detection unit 72, as the optimum times, and stores it in the flash ROM 36 via the parameter setting unit 68, as time generation management information of the hard disk controller 28 which act as a read gate generation unit.

Figure 5A:
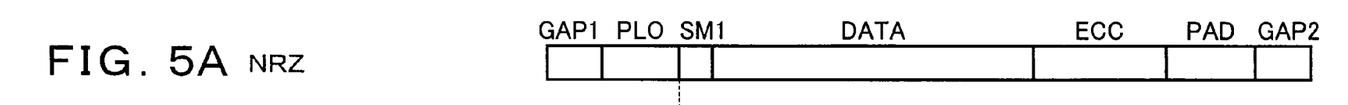
FIGS. 5A to 5F are timing charts of write and read in the invention.
Figure 5B:
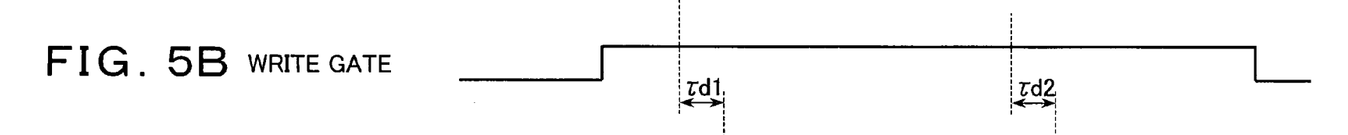
Figure 5C:
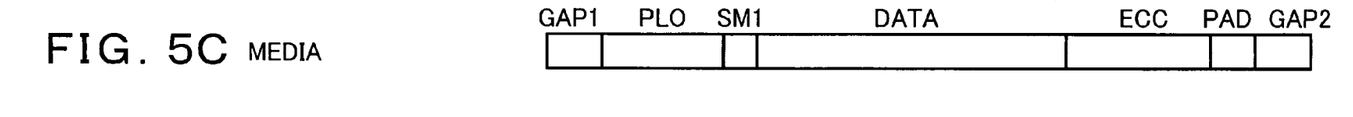
Figure 5D:
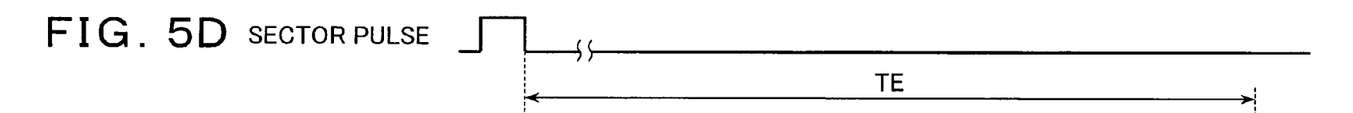
Figure 5E:
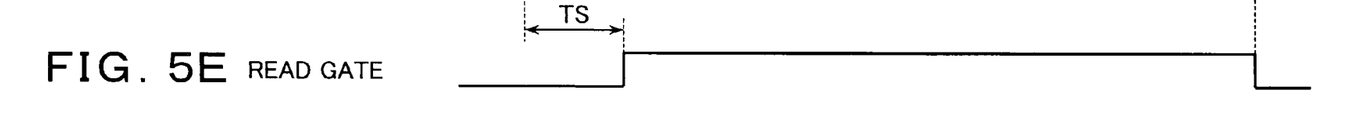
Figure 5F:
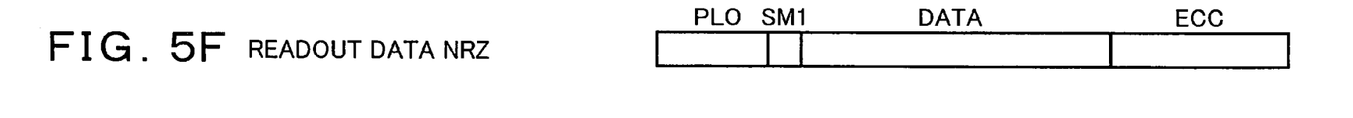

FIGS. 5A to 5F are timing charts of write and read in the magnetic disk apparatus of the invention. FIG. 5A is formatted NRZ write data which is output from the hard disk controller 28 and consists of a gap domain GAP1, a pilot domain PLO, a servo-membrane domain SM1, a data domain Data, an error detection and correction domain ECC, a pad domain PAD and a gap domain GAP2. This NRZ write data is written on medium as shown in FIG. 5C based on the write gate signal of FIG. 5B. At this point, an encode delay td1 is generated in a pilot portion PLO in the data written on the medium, and also an encode delay td2 is generated for the data domain Data. In a read operation, the read gate signal of FIG. 5E is generated from the predefined read start time TS and read end time TE using the sector pulse of FIG. 5D as reference, and by executing the read operation according to the read gate signal, NRZ read data having the format shown in FIG. 5F is output to the hard disk controller 28.

Figure 6:
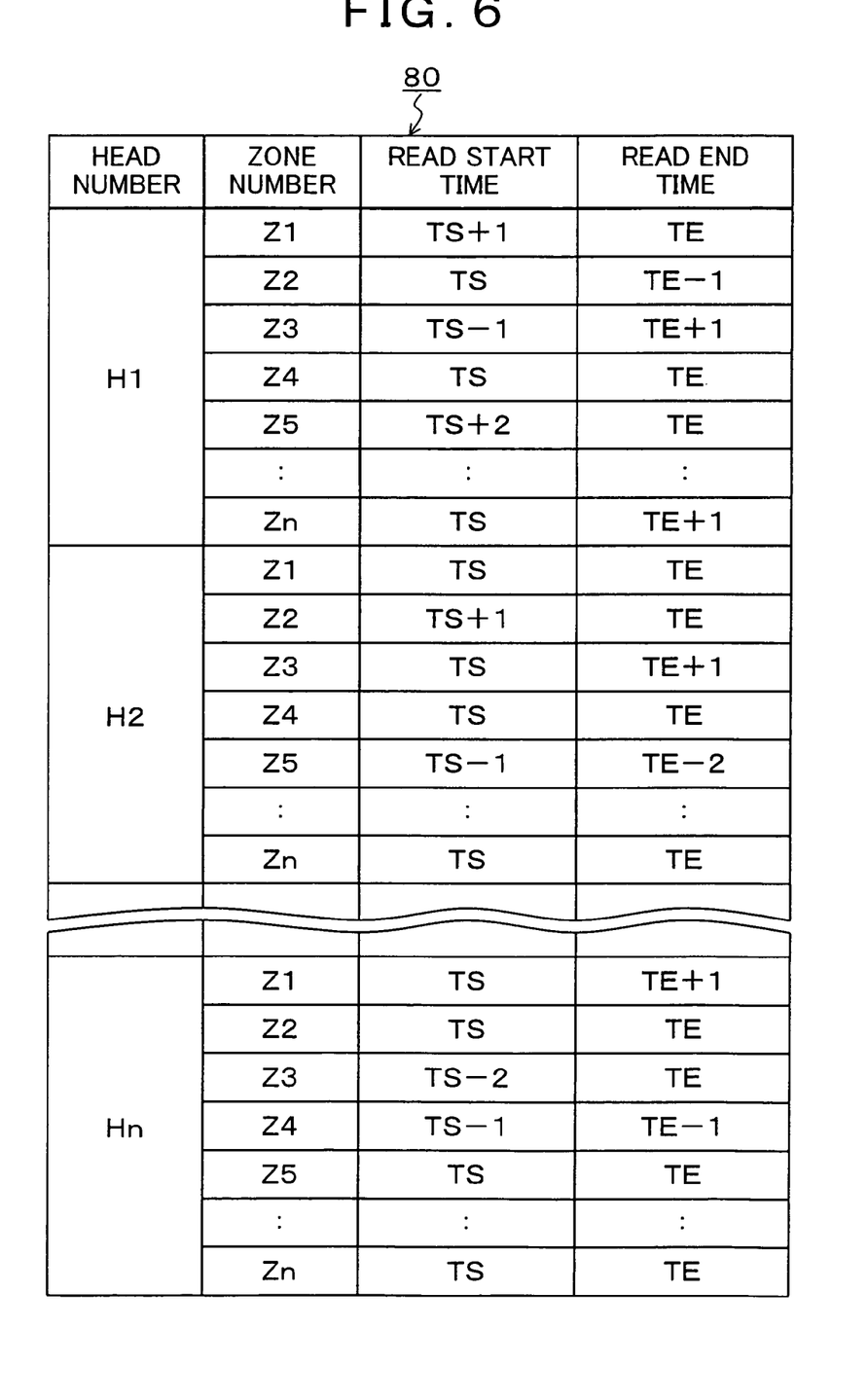
FIG. 6 is an explanatory diagram of the read gate time table generated by the read gate optimization process of FIG. 3.

FIG. 6 is an explanatory diagram of a read gate time table whish is generated in the process of the read gate optimization unit 66 of FIG. 3 and set to the flash ROM 36 in order to generate the read gate signal with the hard disk controller 28. In this read gate time table 80, the read start times and th read gate end times obtained by the read gate signal optimization process are divided by the head numbers and the zone number of medium and stored. Also, the read start times and the read gate end times are stored as values obtained by adding or subtracting the byte time as the variable amount adjusted for timing by the optimization process to or from the default read start time TS and read end time TE indicated in the parameter table 78 of FIG. 4.

Figure 7:
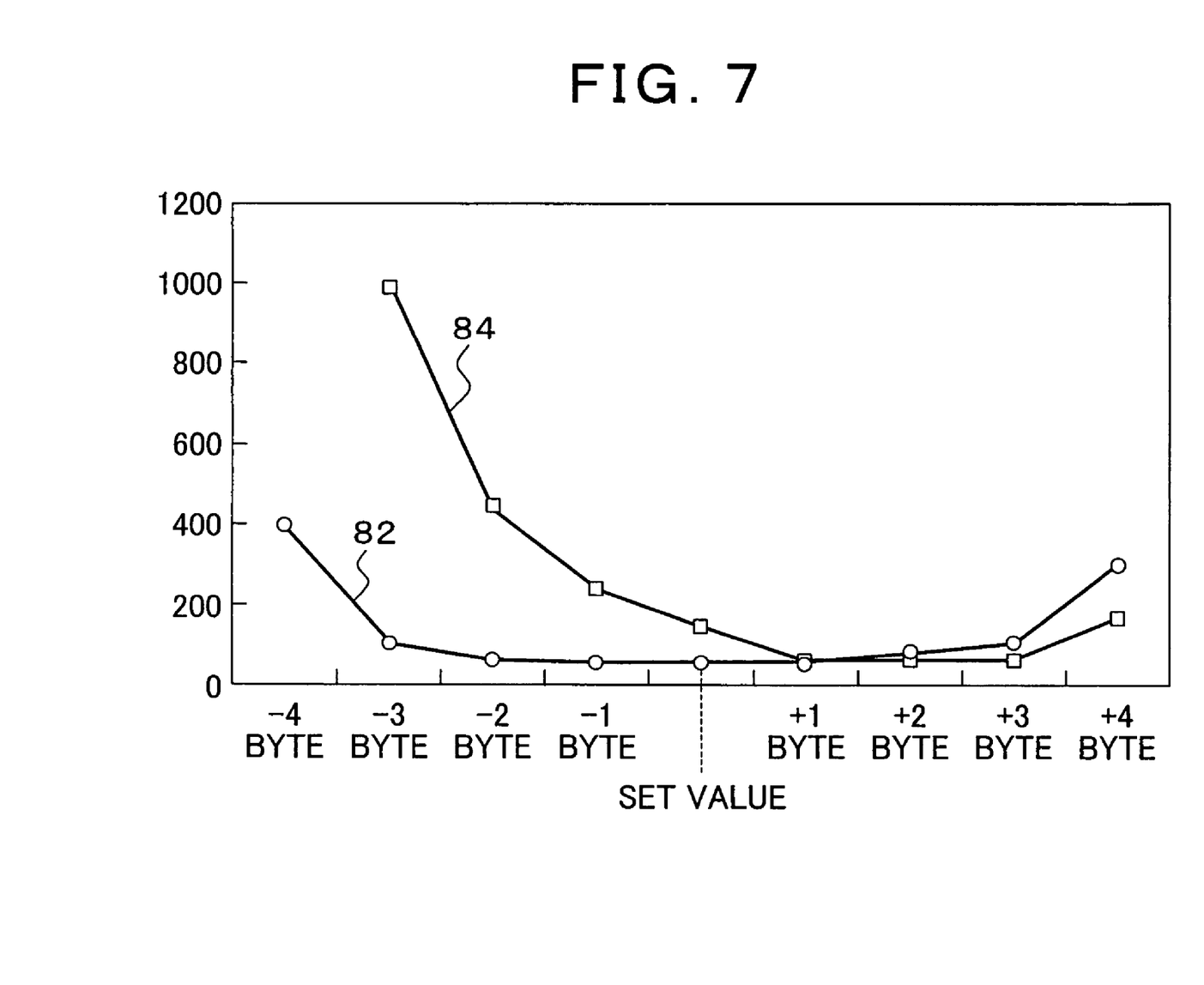
FIG. 7 is an explanatory diagram of an error rate when the read start time is changed in the invention.

FIG. 7 is an explanatory diagram of an error rate detected when an optimum value is determined while the read start time is changed by the read gate optimization unit 66 of FIG. 3. In the read gate optimization unit 66 of FIG. 3, a timing adjustment is performed according to the changes of the read start time including nine (9) set values 0, +1 to +4, and −1 to −4 as the variable amount of the read start time TS as shown in the parameter table 78 of FIG. 4, and by showing error rates obtained by each timing adjustment time, or the number of errors indicated by the vertical axis, as broken lines, for example property curves 82 and 84 are taken as example. First, the property curve 82 is in the case that the read gate start time corresponding to a set value is optimum, and for adjustment with each byte time of +1 to +4 and −1 to −4 around the set value, the error count indicates a minimum value almost same as the case of the set value in the range from −3 to +3. Therefore, it may be said that the read gate start time as the set value is a stable value, because errors are minimum and it has sufficient timing margins temporally backward and forward. In contrast to this, the property curve 84 is in the case that the read gate start time corresponding to a set value as a default is not optimum, and a minimum value of the error count is obtained at each byte time of +1, +2 and +3 byte which is on the +side to the set value. In this case, in order to minimize the error count and provide sufficient margins to the forward and backward sides, the optimum value for the read gate start time may be +2 byte to shift it to the backward of the time of the set value. These determinations of the optimum values at which the error count may be minimized and the sufficient margins may be provided for the read gate start time based on the error count is performed for an error gate end time as well. Also, in stead of the error count, for the Viterbi metric margins obtained in the Viterbi decoder, an optimum time at which the margin is maximized, in other words, a time at which the number of failing branches is minimized and which has sufficient margins is determined as an optimum time.

Figure 8:
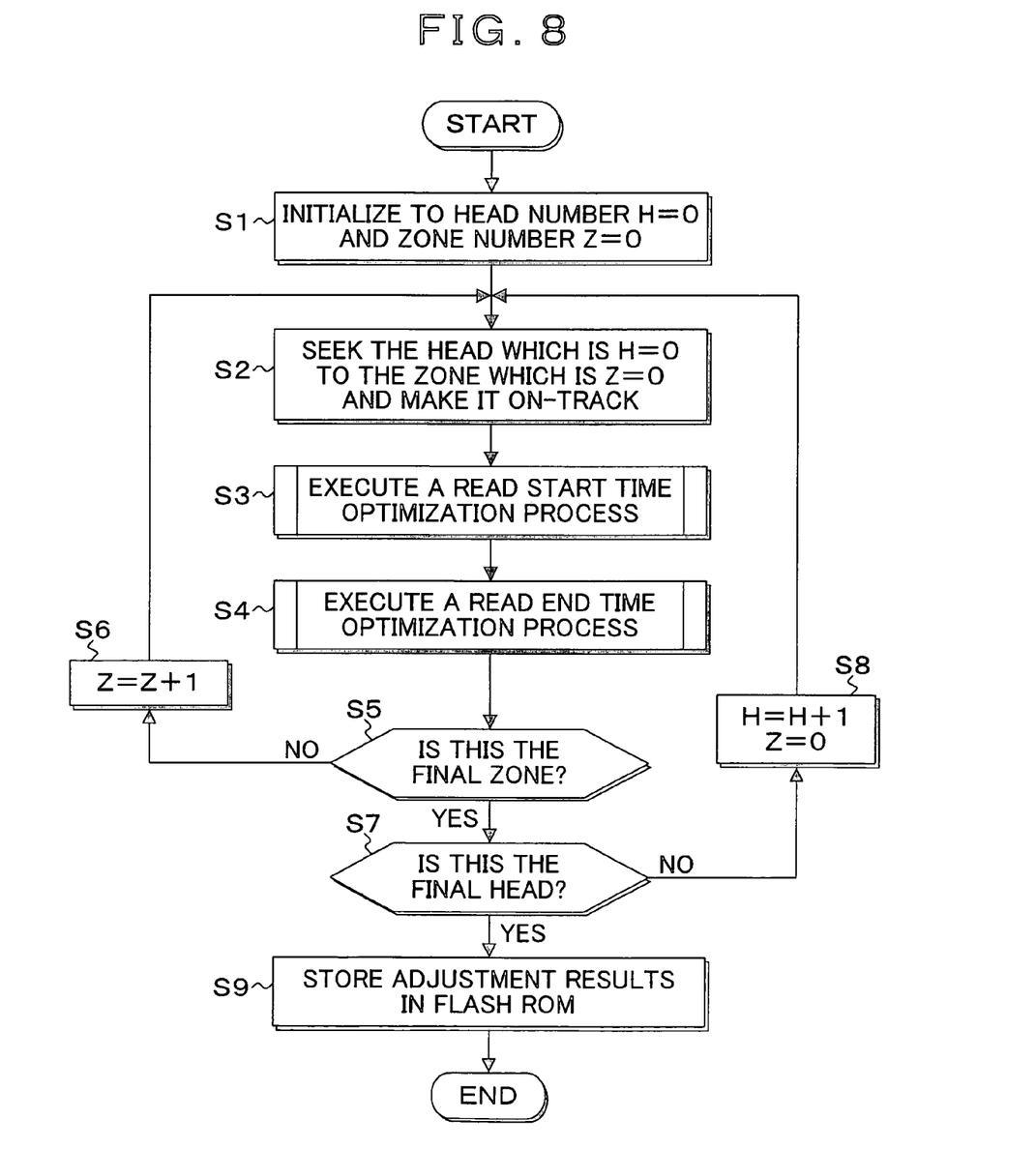
FIG. 8 is a flowchart of a read gate optimization process of the invention.

FIG. 8 is a flowchart of the read gate optimization process according to the invention, and this process procedure represents details of the program in MPU 34 of FIG. 3. Here, the read gate optimization process of FIG. 8 is executed at the following timings in the magnetic disk apparatus.

(1) Execute the read gate optimization process at the time of the power-on start.

(2) After executing the read gate optimization process at the time of the power-on start, subsequently execute the read gate optimization process according to a predefined time schedule.

(3) When a change of environmental conditions, such as a temperature inside the magnetic disk apparatus, are detected, execute the read gate optimization process. Also, when the read gate optimization process is executed during the magnetic disk apparatus is operating, it will be executed in idle state during which the read/write operation is not performed. Further, the read gate optimization process of the invention is executed for each zone, and in this case, after writing the test data in predefined location within the selected zone for a start, then the read gate optimization process will be executed while performing the test read. As the test data used in the read gate optimization process, although it is possible to use the user data directly, it is preferred to allocate a dedicated domain for the test data, to write the test data in this domain and to perform the test read, in order to avoid, for example, damages of the test data. The procedure of the read gate optimization process of FIG. 8 is as follows.

Step 1: Initialize to head number H=0 and zone number Z=0.

Step 2: Seek the head which is head number H=0 to the zone which is Z=0, and make it on-track.

Step 3: Execute an optimization process for a read start time.

Step 4: Execute an optimization process for a read end time.

Step 5: Determine whether it is the final Zone or not, and if it is not the final zone, proceed to step S6. If it is the final zone, proceed to step S7.

Step 6: Increment the Zone number Z by 1, and back to step S2.

Step 7: Determin whether it is the final Zone or not, and if it is not the final zone, proceed to step S8, and if it is the final zone, proceed to step S9.

Step 8: Increment the zone number H by 1 and initialize the zone number to Z=0, then back to step S2.

Step 9: Store the read gate time table such as shown in FIG. 6, obtained as an adjustment result, into the flash ROM 36 on the hard disk controller 28 side.

Figure 9:
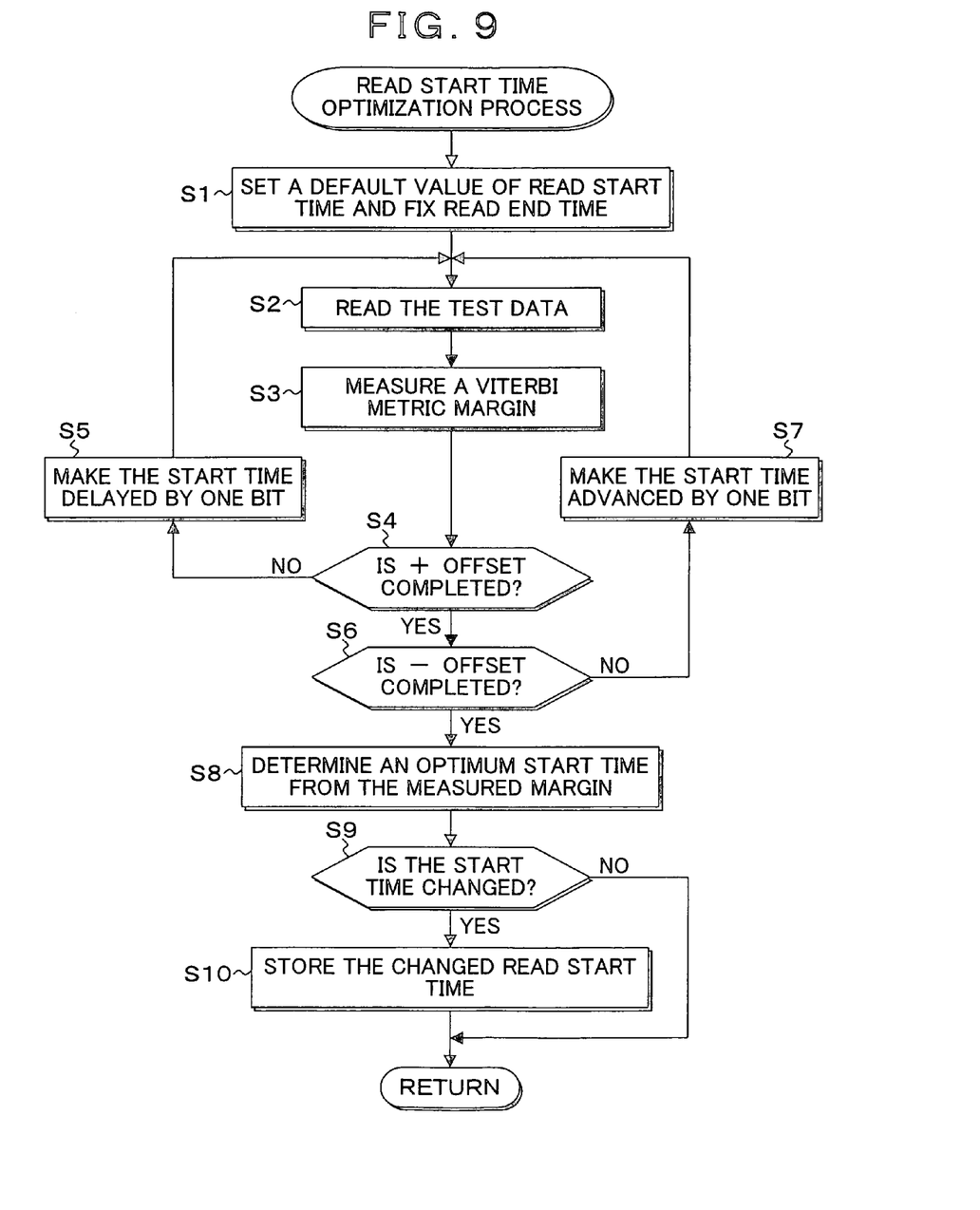
FIG. 9 is a flowchart of the read start time optimization process in FIG. 8.

FIG. 9 is a flowchart of the read start time optimization process of step S3 in FIG. 8 and executed as following process procedure. It is noted that the case that Viterbi metric margins are measured as errors are taken as an example in this flowchart.

Step 1: Set a default value TS of the read start time and fix the read end time TE.

Step 2: Execute reading of the test data by generating a read gate signal which has the adjusted read start time and the fixed read end time.

Step 3: Measure Viterbi metric margins in the Viterbi decoder 60.

Step 4: Check whether offsets according to +byte times are completed or not, and if not completed, proceed to step S5, and if completed, proceed to step S6.

Step 5: Set the read start time TS as (TS+1) to delay it by one (1) bit.

Step 6: Check whether—offsets for the read start time are completed or not. If not completed, proceed to step S7, and if completed, proceed to step S8.

Step 7: Set the read start time TS as (TS+1) to advance it by one (1) bit.

Step 8: Determine an optimum start time from the measured Viterbi metric margins.

Step 9: Determine whether the read start time is changed or not, and if not changed, terminate the process, and if changed, proceed to step S10.

Step 10: store the changed read start time on the table.

Figure 10:
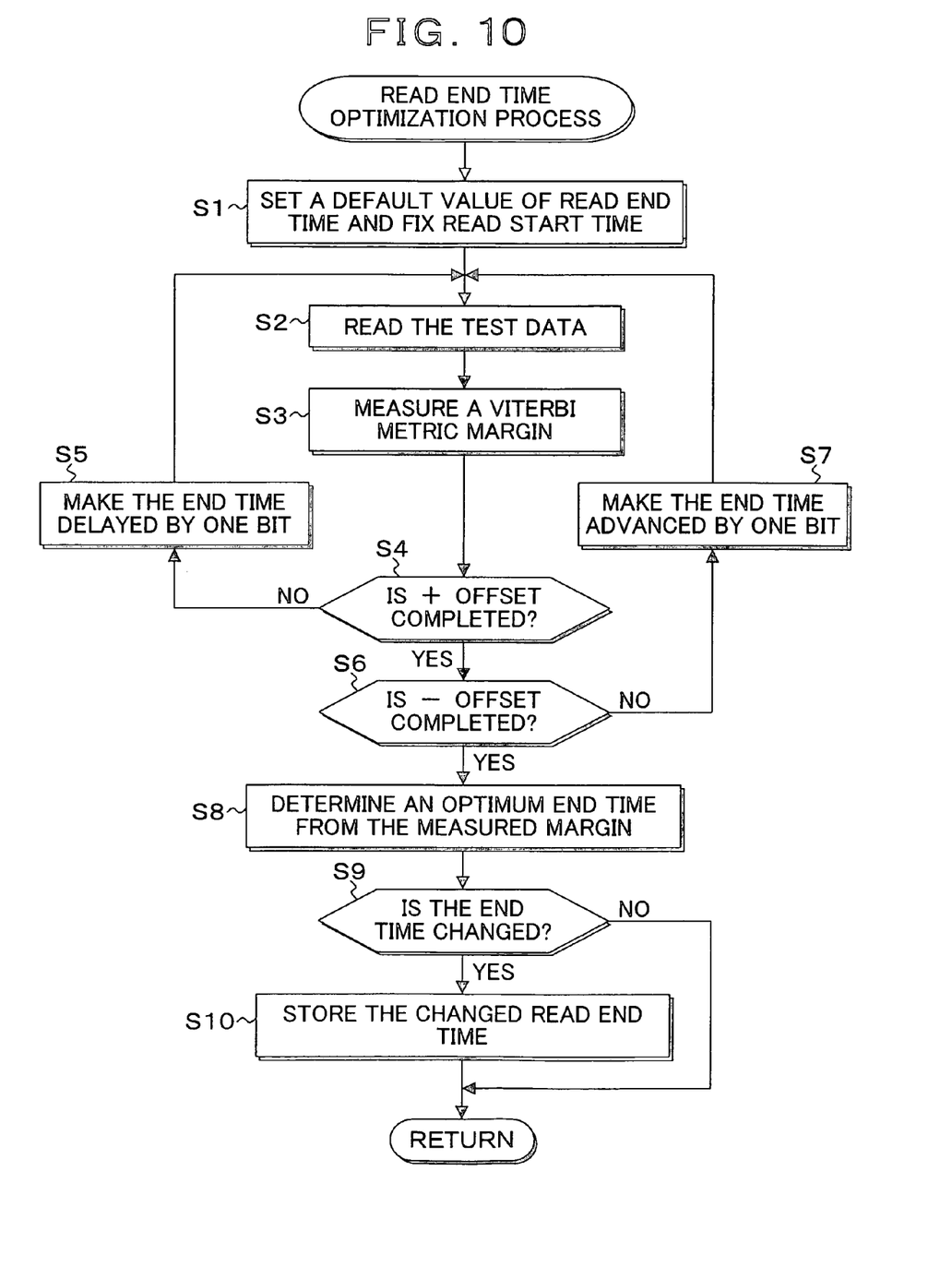
FIG. 10 is a flowchart of the read end time optimization process in FIG. 8.

FIG. 10 is a flowchart of the read end time optimization process of step S4 in FIG. 8. This process procedure of the read end time optimization process is basically the same as that of the read start time optimization process of FIG. 9, and when reading, it is possible to replace the read start time TS with the read end time TE.

Step 1: Set a default value TE of the read end time and fix the read start time TS.

Step 2: Execute reading of the test data by generating a read gate signal which has the fixed read start time and the adjusted read end time.

Step 3: Measure Viterbi metric margins in the Viterbi decoder 60.

Step 4: Check whether offsets according to +byte times are completed or not, and if not completed, proceed to step S5, and if completed, proceed to step S6.

Step 5: Set the read start time TS as (TS+1) to delay it by one (1) bit.

Step 6: Check whether—offsets for the read end time are completed or not. If not completed, proceed to step S7, and if completed, proceed to step S8.

Step 7: Set the read end time TS as (TS+1) to advance it by one (1) bit.

Step 8: Determine an optimum end time from the measured Viterbi metric margins.

Step 9: Determine whether the read end time is changed or not, and if not changed, terminate the process, and if changed, proceed to step S10.

Step 10: store the changed read end time on the table. It is noted that, in above embodiments, although both of the read start time and the read end time of the read gate signal are adjusted by timing adjustments, this may be an embodiment in which only the read start time is optimized by the timing adjustment or may be an process in which only the read end time is optimized by the timing adjustment.

According to the invention described above, by performing optimization for a read start time of a read gate, it is possible to correctly execute read operations targeting data read out from medium and to achieve the data readout with fewer errors. Also, by performing optimization for a read end time, it is possible to ensure that the data written on medium is read till the end, and as a result, even if the reading process is terminated earlier by the pipeline processing than the case without the pipeline processing, it is possible to read the data on medium to the correct position, and the trash data which is not written after a pad portion will not read anymore, so it is possible to prevent miscorrection in ECC. It will be appreciated that the invention is not limited to the above embodiments but that it includes any alterations without impairing the object and advantages thereof. Also, the invention is not intended to be restricted by the numerical values indicated in the above embodiments.

What is claimed is:

1. A magnetic disk apparatus including:
   a read gate generation unit which generates a read gate signal having a predefined read start time and read end time that are set using a sector pulse as a reference; and
   a data demodulation unit which reproduces read data from a medium readout signal by executing a read based on the read gate signal,
   the magnetic disk apparatus comprising:
   a read gate optimization unit which detects errors of read data demodulated by the data demodulation unit while varying the read start time and the read end time of the read gate signal, the read gate optimization unit determining the read start time and the read end time at which the detected errors are minimized and setting the determined read start and end times in the read gate generation unit; and
   wherein the read gate optimization unit includes:
   a timing adjustment unit which varies the read start time and the read end time of the read gate signal for output to the data demodulation unit, for each of plural times of executions of test read;
   an error detection unit which detects errors of the read data demodulated by the data demodulation unit, for each execution of test read, based on the read gate signal output from the timing adjustment unit; and
   an optimum time determination unit which determines as optimum times the read start time and the read end time of the read gate signal at which the errors are minimized of a plurality of errors detected by the error detection unit, the optimum time determination unit setting the determined optimum times in the read gate generation unit.

2. The magnetic disk apparatus according to claim 1, wherein
   the timing adjustment unit varies the read start time and the read end time of the read gate signal individually, and wherein
   the optimum time determination unit individually determines the read start time and the read end time at which the errors detected by the error detection unit are minimized, for setting in the read gate generation unit.

3. The magnetic disk apparatus according to claim 1, wherein
the timing adjustment unit varies the read start time and the read end time backward and forward around a default value in a predefined time unit.

4. The magnetic disk apparatus according to claim 1, wherein
the timing adjustment unit varies the read start time and the read end time backward and forward around a default value in a read data one byte time unit.

5. The magnetic disk apparatus according to claim 1, wherein
the error detection unit detects as the read data errors Viterbi metric margins of a Viterbi determination unit disposed in the data demodulation unit, and wherein
the optimum time determination unit determines the read start time and the read end time at which the detected Viterbi metric margins are maximized, for setting in the read gate generation unit.

6. The magnetic disk apparatus according to claim 1, wherein
the error detection unit detects an error rate of the read data demodulated by the data demodulation unit, and wherein
the optimum time determination unit determines the read start time and the read end time at which the detected error rate is minimized, for setting in the read gate generation unit.

7. The magnetic disk apparatus according to claim 1, wherein
the read gate optimization unit is operated at the time of power-on start.

8. The magnetic disk apparatus according to claim 1, wherein
the read gate optimization unit is operated in accordance with a predefined time schedule.

9. The magnetic disk apparatus according to claim 1, wherein
the read gate optimization unit is operated when a change is detected in environmental conditions such as a temperature inside the apparatus.

10. The magnetic disk apparatus according to claim 1, wherein
when a plurality of readout heads are disposed, the read gate optimization unit is operated on a head-to-head basis.

11. The magnetic disk apparatus according to claim 1, wherein
when the medium is divided into zones, the read gate optimization unit is operated on a zone-to-zone basis.

12. A read gate optimization method for a magnetic disk apparatus including a read gate generation unit which generates a read gate signal having a predefined read start time and read end time that are set using a sector pulse as a reference, and a data demodulation unit which reproduces read data from a medium readout signal by executing a read based on the read gate signal, the method comprising:
a timing adjustment step varying the read start time and the read end time of the read gate signal for output to the data demodulation unit, for each of plural times of executions of test read;
an error detection step detecting errors of the read data d modulated in the data demodulation unit, for each execution of test read, based on the read gate signal output in the timing adjustment step; and
an optimum time determination step determining as optimum times the read start time and the read end time of the read gate signal at which the errors are minimized of a plurality of errors detected in the error detection step, and setting the determined optimum times in the read gate generation unit.

13. The read gate optimization method for a magnetic disk apparatus according to claim 12, wherein
the timing adjustment step includes varying individually the read start time and the read end time of the read gate signal.

14. The read gate optimization method for a magnetic disk apparatus according to claim 12, wherein
the timing adjustment step includes varying the read start time and the read end time backward and forward around a default value in a predefined time unit.

15. The read gate optimization method for a magnetic disk apparatus according to claim 12, wherein
the timing adjustment step includes varying the read start time and the read end time backward and forward around a default value in a read data one byte time unit, for detection of errors.

16. The read gate optimization method for a magnetic disk apparatus according to claim 12, wherein
the error detection step includes detecting as the read data errors Viterbi metric margins of a Viterbi determination unit disposed in the data demodulation unit, and wherein
the optimum time determination step includes determining the read start time and the read end time at which the detected Viterbi metric margins are maximized, and setting the determined times in the read gate generation unit.

17. The read gate optimization method for a magnetic disk apparatus according to claim 12, wherein
the error detection step includes detecting an error rate of the read data demodulated by the data demodulation unit, and wherein
the optimum time determination step includes determining the read start time and the read end time at which the detected error rate is minimized are determined, and setting the determined times in the read gate generation unit.

18. A program embodied in a computer readable medium to cause a computer, the computer being incorporated in a magnetic disk apparatus including a read gate generation unit which generates a read gate signal having a predefined read start time and read end time that are set using a sector pulse as a reference, and a data demodulation unit which reproduces read data from a medium readout signal by executing a read based on the read gate signal, to execute the steps of:
a timing adjustment step varying the read start time and the read end time of the read gate signal for output to the data demodulation unit, for each of plural times of executions of test read;
an error detection step detecting errors of the read data demodulated in the data demodulation unit, for each execution of test read, based on the read gate signal output in the timing adjustment step; and
an optimum time determination step determining as optimum times the read start time and the read end time of the read gate signal at which the errors are minimized of a plurality of errors detected in the error detection step, and setting the determined optimum times in the read gate generation unit.

* * * * *